(12) United States Patent
Hoffmann

(10) Patent No.: US 9,804,479 B2
(45) Date of Patent: Oct. 31, 2017

(54) IMAGE CAPTURING SYSTEM

(71) Applicant: Erich Hoffmann, New Rochelle, NY (US)

(72) Inventor: Erich Hoffmann, New Rochelle, NY (US)

(*) Notice: Subject to any disclaimer, the term of this patent is extended or adjusted under 35 U.S.C. 154(b) by 0 days.

(21) Appl. No.: 14/980,051

(22) Filed: Dec. 28, 2015

(65) Prior Publication Data

US 2017/0184946 A1    Jun. 29, 2017

(51) Int. Cl.
| G03B 17/56 | (2006.01) |
| G03B 29/00 | (2006.01) |
| F16M 13/02 | (2006.01) |

(52) U.S. Cl.
CPC ......... *G03B 17/561* (2013.01); *F16M 13/022* (2013.01); *G03B 29/00* (2013.01)

(58) Field of Classification Search
CPC ..... G03B 17/561; G03B 29/00; F16M 13/022
See application file for complete search history.

(56) References Cited

U.S. PATENT DOCUMENTS

| 6,076,978 A | 6/2000 | McIlvenna |
| 6,384,863 B1 | 5/2002 | Bronson |
| 7,706,673 B1 | 4/2010 | Staudinger |
| 8,002,480 B2 | 8/2011 | Polster |
| D653,190 S | 1/2012 | Richter |
| 2006/0197001 A1* | 9/2006 | Parker .................... F16M 11/10 248/230.8 |
| 2010/0005636 A1 | 1/2010 | Liao et al. |
| 2010/0264182 A1 | 10/2010 | Perlman et al. |
| 2013/0004153 A1* | 1/2013 | McKee ............... F16M 11/041 396/420 |
| 2014/0191095 A1* | 7/2014 | Le Gette ................ F16M 13/00 248/176.3 |
| 2014/0252188 A1* | 9/2014 | Webster ............... F16M 13/022 248/229.17 |

FOREIGN PATENT DOCUMENTS

WO  WO2007112638  10/2007

* cited by examiner

*Primary Examiner* — Gevell Selby

(57) ABSTRACT

An image capturing system includes an electronic device that may capture an image. A vessel is provided and the vessel may be carried. A mounting unit is removably coupled to the vessel. The electronic device is removably coupled to the mounting unit. Thus, the electronic device may capture an image of a user when the user holds the vessel. Thus, the user does not have to set the vessel down to capture the image.

10 Claims, 5 Drawing Sheets

IMAGE CAPTURING SYSTEM

BACKGROUND OF THE DISCLOSURE

Field of the Disclosure

The disclosure relates to image capturing devices and more particularly pertains to a new image capturing device for coupling a camera to a beverage container.

SUMMARY OF THE DISCLOSURE

An embodiment of the disclosure meets the needs presented above by generally comprising an electronic device that may capture an image. A vessel is provided and the vessel may be carried. A mounting unit is removably coupled to the vessel. The electronic device is removably coupled to the mounting unit. Thus, the electronic device may capture an image of a user when the user holds the vessel. Thus, the user does not have to set the vessel down to capture the image.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
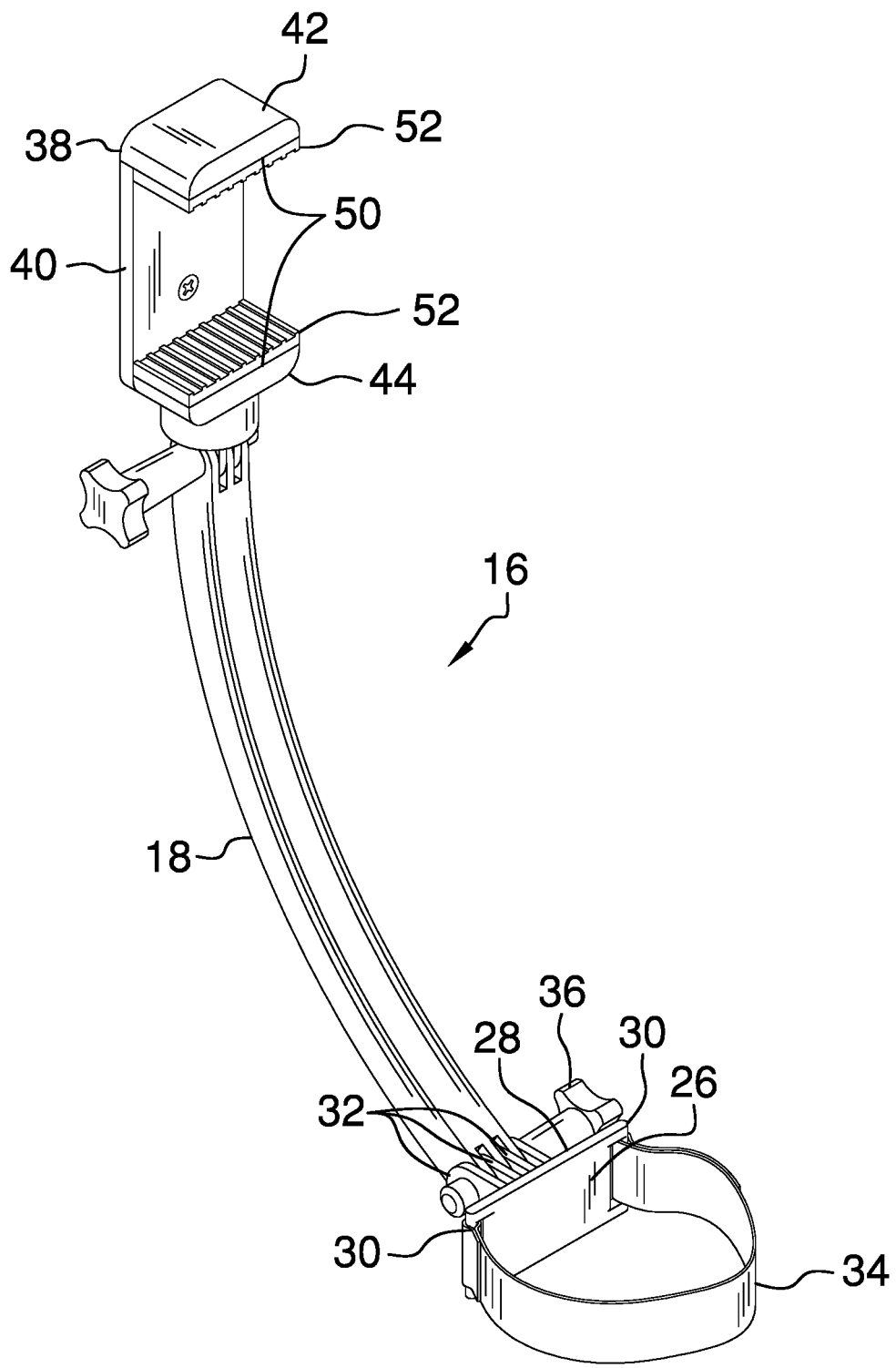
FIG. 1 is a perspective view of an image capturing system according to an embodiment of the disclosure.
Figure 2:
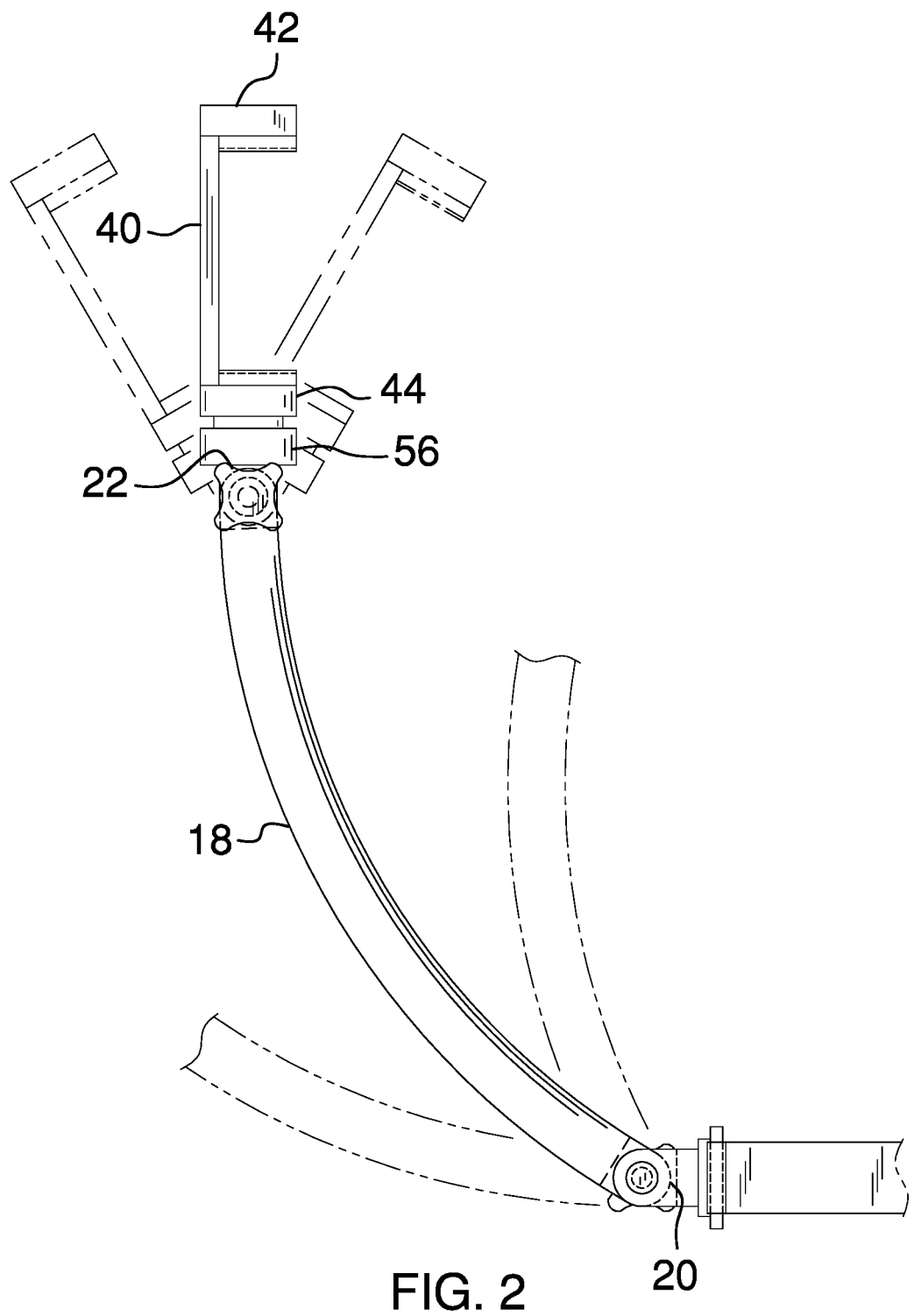
FIG. 2 is a right side view of an embodiment of the disclosure.
Figure 3:
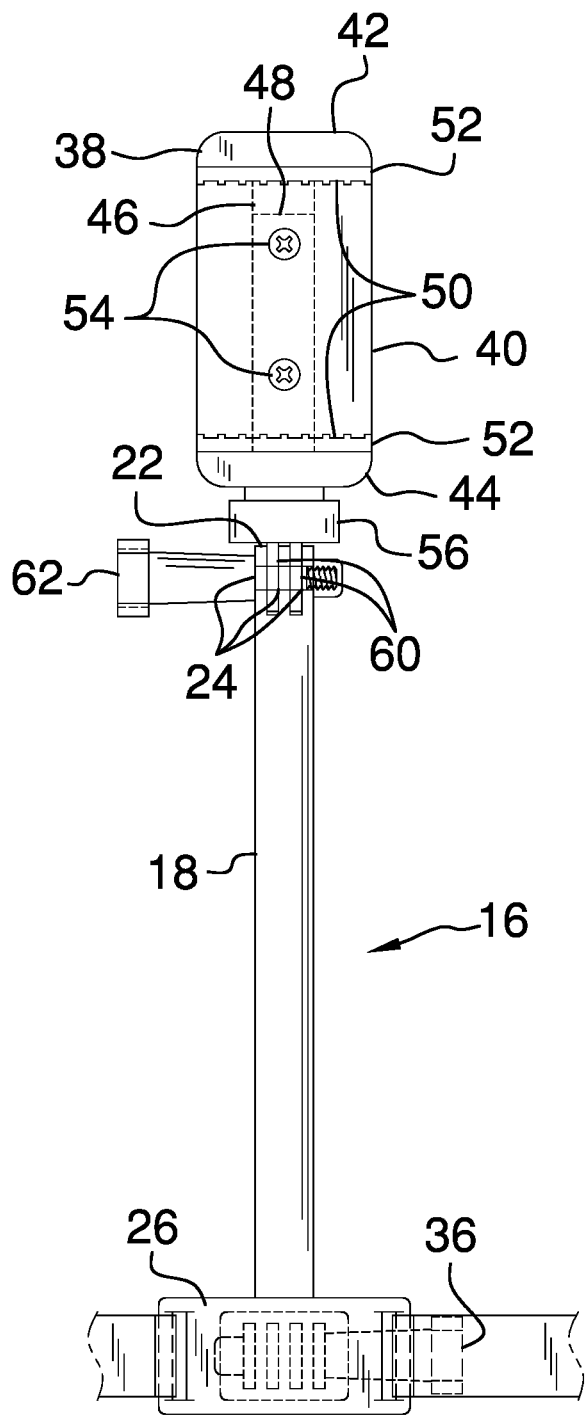
FIG. 3 is a front view of an embodiment of the disclosure.
Figure 4:
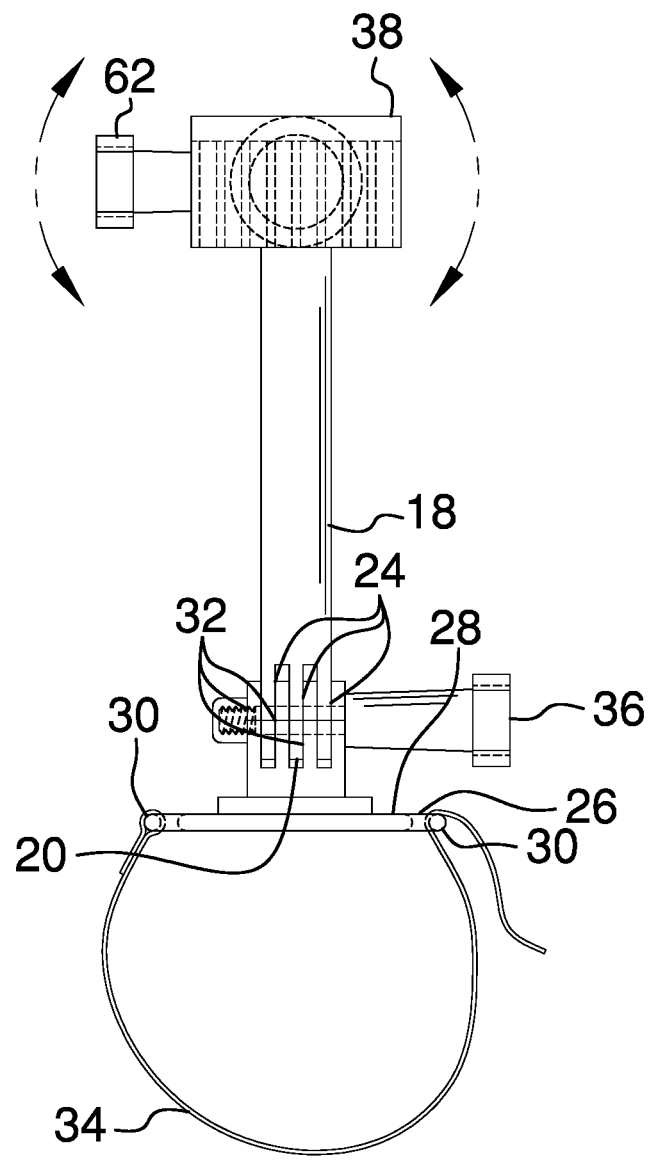
FIG. 4 is a top view of an embodiment of the disclosure.
Figure 5:
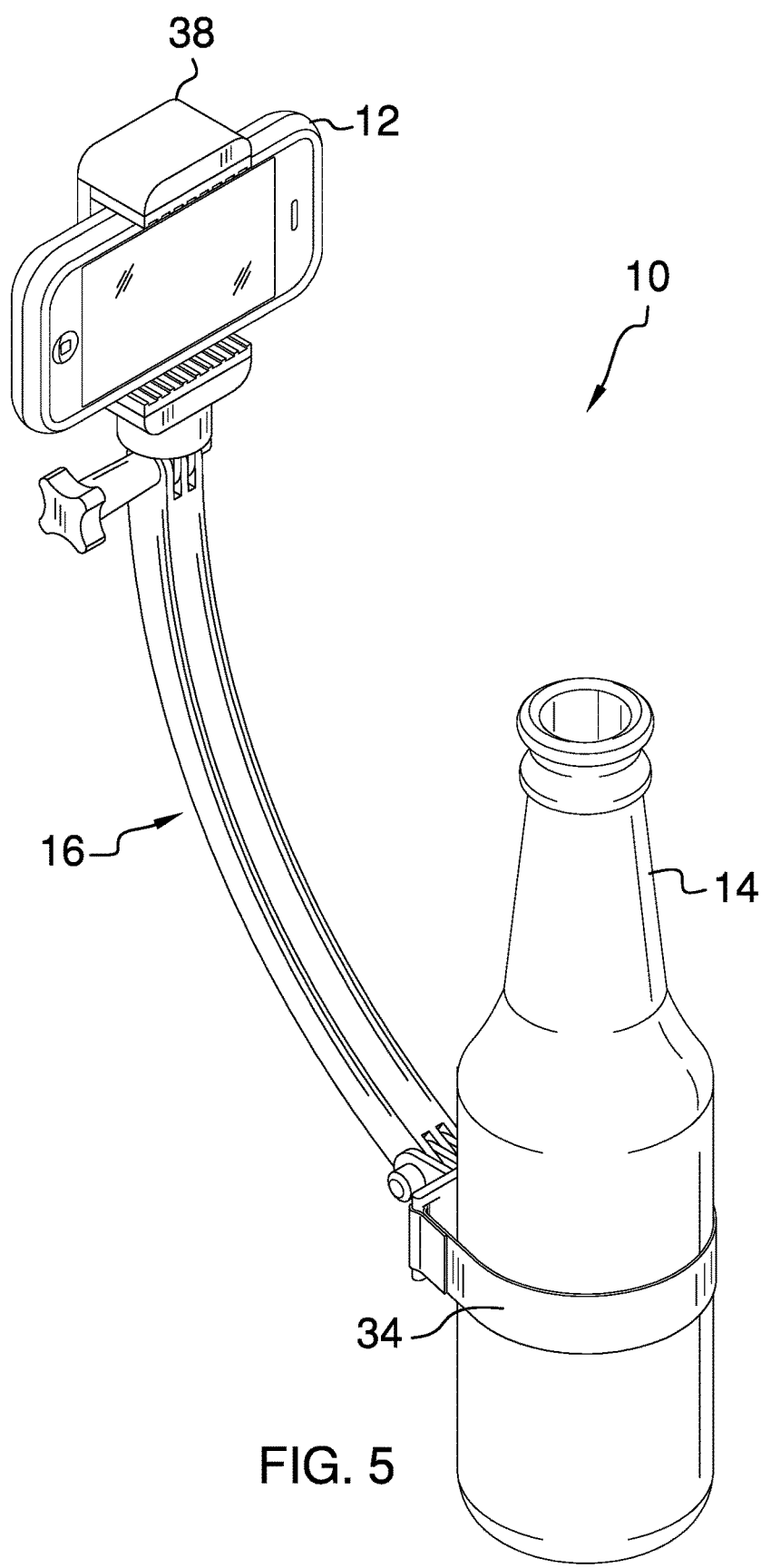
FIG. 5 is a perspective in-use view of an embodiment of the disclosure.

With reference now to the drawings, and in particular to FIGS. 1 through 5 thereof, a new image capturing device embodying the principles and concepts of an embodiment of the disclosure and generally designated by the reference numeral 10 will be described.

As best illustrated in FIGS. 1 through 5, the image capturing system 10 generally comprises an electronic device 12 that may capture an image. The electronic device 12 may comprise a smart phone, a digital camera or other electronic device used to capture images. A vessel 14 is provided and the vessel 14 may be carried. The vessel 14 may comprise a beverage container or the like. Additionally, the vessel 14 may be any vessel having a substantially cylindrical shape.

A mounting unit 16 is provided and the mounting unit 16 is removably coupled to the vessel 14. The electronic device 12 is removably coupled to the mounting unit 16. The electronic device 12 may capture an image of a user when the user holds the vessel 14. Thus, the user does not have to set the vessel 14 down to capture the image.

The mounting unit 16 comprises an arm 18 that has a first end 20 and a second end 22. The arm 18 is curved between the first end 20 and the second end 22 such that the arm 18 defines an arc of a circle. The arm 18 is longitudinally divided at each of the first end 20 and the second end 22 to define a plurality of fingers 24 on each of the first end 20 and the second end 22. The fingers 24 corresponding to the first end 20 are spaced apart from each other. The fingers 24 corresponding to the second end 22 are spaced apart from each other. The arm 18 may have a length ranging between approximately twenty cm and twenty five cm.

A plate 26 is provided that has a first surface 28 and a pair of lateral edges 30. The plate 26 has a plurality of fingers 32 extending away from the first surface 28. The fingers 32 corresponding to the plate 26 are spaced apart from each other and distributed on the first surface 28. Each of the fingers 32 corresponding to the plate 26 intersects with the fingers 24 corresponding to the first end 20. Thus, the plate 26 is hingedly coupled to the arm.

A strap 34 is coupled between the lateral edges 30 of the plate 26. The strap 34 is selectively wrapped around the vessel 14 such that the arm 18 is removably coupled to the vessel 14. The strap 34 is matable to itself. The strap 34 is tightened around the vessel 14 and the strap 34 is mated to itself. Thus, the strap 34 compresses the vessel 14 against the plate 26. The strap 34 may comprise a hook and loop fastener or the like.

A first bolt 36 extends through the fingers 32 corresponding to the plate 26 and the fingers 24 corresponding to the first end 20. The first bolt 36 may be manipulated. The first bolt 36 urges the fingers 32 corresponding to the plate 26 to frictionally engage the fingers 24 corresponding to the first end 20 when the first bolt 36 is tightened. Thus, the arm 18 is retained at a selected angle with respect to the vessel 14 when the arm 18 is coupled to the vessel 14.

A gripping head 38 is provided. The gripping head 38 has a central plate 40 extending between a top plate 42 and a bottom plate 44. The top plate 42 is spaced from the bottom plate 44 such that the gripping head 38 has a C-shape. The top plate 42 is coupled to the central plate 40 and the central plate 40 has a channel 46 therein. The channel 46 extends between the top plate 42 and the bottom plate 44.

The bottom plate 44 has a member 48 extending upwardly therefrom. The member 48 is slidably positioned within the channel 46. Thus, the top plate 42 may be selectively spaced a selected distance from the bottom plate 44. The electronic device 12 is positioned between the top plate 42 and the bottom plate 44. The top plate 42 is urged to compress the electronic device 12 between the top plate 42 and the bottom plate 44. Thus, the electronic device 12 is removably coupled to the gripping head 38.

Each of the top plate 42 and the bottom plate 44 has an inwardly facing surface 50. A pair of grips 52 is provided. Each of the grips 52 is attached to the inwardly facing surface 50 of an associated one of the top plate 42 and the bottom plate 44. Each of the grips 52 is comprised of a resiliently compressible material. Thus, the grips 52 enhance gripping the electronic device 12.

A pair of fasteners 54 is provided. Each of the fasteners 54 extends through the central plate 40 and engages the member 48. Each of the fasteners 54 may be manipulated.

Each of the fasteners 54 retains the top plate 42 at the selected distance from the bottom plate 44. Each of the fasteners 54 may comprise a screw or the like.

A swivel 56 is rotatably coupled to a lower surface 58 of the bottom plate 44. The swivel 56 is rotatable about an axis extending through the top plate 42 and the bottom plate 44. The swivel 56 has a plurality of fingers 60 extending away from the bottom plate 44. The fingers 60 corresponding to the swivel 56 are spaced apart from each other. Each of the fingers 60 corresponding to the swivel 56 intersects the fingers 24 corresponding to the second end 20 of the arm 18. Thus, the gripping head 38 is hingedly coupled to the arm 18.

A second bolt 62 is provided. The second bolt 62 extends through the fingers 60 corresponding to the swivel 56 and the fingers 24 corresponding to the second end 22. The second bolt 62 may be manipulated. The second bolt 62 urges the fingers 60 corresponding to the swivel 56 to frictionally engage the fingers 54 corresponding to the second end 22 when the second bolt 62 is tightened. Thus, the gripping head 38 is retained at a selected angle with respect to the arm 18.

In use, the strap 34 is wrapped around the vessel 14 and the strap 34 is tightened around the vessel 14. The arm 18 is manipulated to position the arm 18 at the selected angle with respect to the vessel 14. The first bolt 36 is manipulated to retain the arm 18 at the selected angle with respect to the vessel 14. The electronic device 12 is positioned in the gripping head 38. The top plate 42 is manipulated to compress the electronic device 12 between the top plate 42 and the bottom plate 44. The gripping head 38 is rotated on the swivel 56 and the gripping head 38 is positioned at selected angle with respect to the arm 18. The second bolt 62 is manipulated to retain the gripping head 38 at the selected orientation.

The electronic device 12 is used to capture images while the vessel 14 is being held. Thus, the vessel 14 does not need to be sat down to facilitate the image to be captured thereby inhibiting tampering with the vessel 14 by someone other than the user. The tampering includes clandestine introduction of a drug into a beverage contained in the vessel 14. Additionally, the mounting unit 16 facilitates self images to be captured from a unique perspective with respect to the vessel 14 and the user.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An image capturing system comprising:
   an electronic device being configured to capture an image;
   a vessel being configured to be carried;
   a mounting unit being removably coupled to said vessel, said electronic device being removably coupled to said mounting unit wherein said electronic device is configured to capture an image of a user when the user holds the vessel thereby inhibiting the user from setting said vessel down to capture the image; and
   wherein said mounting unit comprises an arm having a first end and a second end, said arm being curved between said first end and said second end such that said arm defines an arc of a circle, said arm being longitudinally divided at each of said first end and said second end to define a plurality of fingers on each of said first end and said second end, said fingers corresponding to said first end being spaced apart from each other, said fingers corresponding to said second end being spaced apart from each other.

2. The system according to claim 1, further comprising a plate having a first surface and a pair of lateral edges, said plate having a plurality of fingers extending away from said first surface, said fingers corresponding to said plate being spaced apart from each other and distributed on said first surface, each of said fingers corresponding to said plate intersecting with said fingers corresponding to said first end such that said plate is hingedly coupled to said arm.

3. The system according to claim 2, further comprising a strap being coupled between said lateral edges of said plate, said strap being selectively wrapped around said vessel such that said arm is removably coupled to said vessel.

4. The system according to claim 2, further comprising a first bolt extending through said fingers corresponding to said plate and said fingers corresponding to said first end wherein said first bolt is configured to be manipulated, said first bolt urging said fingers corresponding to said plate to frictionally engage said fingers corresponding to said first end when said bolt is tightened such that said arm is retained at a selected angle with respect to said vessel.

5. An image capturing system comprising:
   an electronic device being configured to capture an image;
   a vessel being configured to be carried;
   a mounting unit being removably coupled to said vessel, said electronic device being removably coupled to said mounting unit wherein said electronic device is configured to capture an image of a user when the user holds the vessel thereby inhibiting the user from setting said vessel down to capture the image; and
   a gripping head having a central plate extending between a top plate and a bottom plate, said top plate being spaced from said bottom plate such that said gripping head has a C-shape, said top plate being coupled to said central plate, said central plate having a channel therein, said channel extending between said top plate and said bottom plate, said bottom plate having a member extending upwardly therefrom, said member being slidably positioned within said channel such that said top plate is selectively spaced a selected distance from said bottom plate, said bottom plate having a lower surface.

6. The system according to claim 5, wherein said electronic device is positioned between said top plate and said bottom plate, said top plate being urged to compress said electronic device between said top plate and said bottom plate such that said electronic device is removably coupled to said gripping head.

7. The system according to claim 5, further comprising a pair of fasteners, each of said fasteners extending through said central plate and engaging said member wherein each of said fasteners is configured to be manipulated, each of said fasteners retaining said top plate at the selected distance from said bottom plate.

8. The system according to claim 5, further comprising:
an arm having a second end, said second end having a plurality of fingers; and
a swivel being rotatably coupled to said lower surface of said bottom plate such that said swivel is rotatable about an axis extending through said top plate and said bottom plate, said swivel having a plurality of fingers extending away from said bottom plate, said fingers corresponding to said swivel being spaced apart from each other, each of said fingers corresponding to said swivel intersecting said fingers corresponding to said second end such that said gripping head is hingedly coupled to said arm.

9. The system according to claim 8, further comprising a second bolt extending through said fingers corresponding to said swivel and said fingers corresponding to said second end wherein said second bolt is configured to be manipulated, said second bolt urging said fingers corresponding to said swivel to frictionally engage said fingers corresponding to said second end when said second bolt is tightened such that said gripping head is retained at a selected angle with respect to said arm.

10. An image capturing system comprising:
an electronic device being configured to capture an image;
a vessel being configured to be carried; and
a mounting unit being removably coupled to said vessel, said electronic device being removably coupled to said mounting unit wherein said electronic device is configured to capture an image of a user when the user holds the vessel thereby inhibiting the user from setting said vessel down to capture the image, said mounting unit comprising:
an arm having a first end and a second end, said arm being curved between said first end and said second end such that said arm defines an arc of a circle, said arm being longitudinally divided at each of said first end and said second end to define a plurality of fingers on each of said first end and said second end, said fingers corresponding to said first end being spaced apart from each other, said fingers corresponding to said second end being spaced apart from each other,
a plate having a first surface and a pair of lateral edges, said plate having a plurality of fingers extending away from said first surface, said fingers corresponding to said plate being spaced apart from each other and distributed on said first surface, each of said fingers corresponding to said plate intersecting with said fingers corresponding to said first end such that said plate is hingedly coupled to said arm,
a strap being coupled between said lateral edges of said plate, said strap being selectively wrapped around said vessel such that said arm is removably coupled to said vessel,
a first bolt extending through said fingers corresponding to said plate and said fingers corresponding to said first end wherein said first bolt is configured to be manipulated, said first bolt urging said fingers corresponding to said plate to frictionally engage said fingers corresponding to said first end when said bolt is tightened such that said arm is retained at a selected angle with respect to said vessel,
a gripping head having a central plate extending between a top plate and a bottom plate, said top plate being spaced from said bottom plate such that said gripping head has a C-shape, said top plate being coupled to said central plate, said central plate having a channel therein, said channel extending between said top plate and said bottom plate, said bottom plate having a member extending upwardly therefrom, said member being slidably positioned within said channel such that said top plate is selectively spaced a selected distance from said bottom plate, said electronic device being positioned between said top plate and said bottom plate, said top plate being urged to compress said electronic device between said top plate and said bottom plate such that said electronic device is removably coupled to said gripping head, said bottom plate having a lower surface,
a pair of fasteners, each of said fasteners extending through said central plate and engaging said member wherein each of said fasteners is configured to be manipulated, each of said fasteners retaining said top plate at the selected distance from said bottom plate,
a swivel being rotatably coupled to said lower surface of said bottom plate such that said swivel is rotatable about an axis extending through said top plate and said bottom plate, said swivel having a plurality of fingers extending away from said bottom plate, said fingers corresponding to said swivel being spaced apart from each other, each of said fingers corresponding to said swivel intersecting said fingers corresponding to said second end such that said gripping head is hingedly coupled to said arm, and
a second bolt extending through said fingers corresponding to said swivel and said fingers corresponding to said second end wherein said second bolt is configured to be manipulated, said second bolt urging said fingers corresponding to said swivel to frictionally engage said fingers corresponding to said second end when said second bolt is tightened such that said gripping head is retained at a selected angle with respect to said arm.

* * * * *